US009137485B2

(12) United States Patent
Bar-Niv et al.

(10) Patent No.: US 9,137,485 B2
(45) Date of Patent: Sep. 15, 2015

(54) HOME NETWORK ARCHITECTURE FOR DELIVERING HIGH-SPEED DATA SERVICES

(75) Inventors: Amir Bar-Niv, Sunnyvale, CA (US); Baruch Bublil, Netanya (IL)

(73) Assignee: Cadence Design Systems, Inc., San Jose, CA (US)

( * ) Notice: Subject to any disclaimer, the term of this patent is extended or adjusted under 35 U.S.C. 154(b) by 640 days.

(21) Appl. No.: 13/010,215

(22) Filed: Jan. 20, 2011

(65) Prior Publication Data

US 2011/0179456 A1 Jul. 21, 2011

Related U.S. Application Data

(60) Provisional application No. 61/297,112, filed on Jan. 21, 2010.

(51) Int. Cl.
| H04N 7/18 | (2006.01) |
| H04N 7/10 | (2006.01) |
| H04N 21/436 | (2011.01) |

(52) U.S. Cl.
CPC ......... *H04N 7/106* (2013.01); *H04N 21/43615* (2013.01)

(58) Field of Classification Search
None
See application file for complete search history.

(56) References Cited

U.S. PATENT DOCUMENTS

| 6,005,861 | A | 12/1999 | Humpleman | |
| 6,553,085 | B1 * | 4/2003 | Trans | 375/346 |
| 8,196,010 | B1 | 6/2012 | Gunnam et al. | |
| 8,307,401 | B1 * | 11/2012 | Lida | 725/80 |
| 8,367,933 | B1 * | 2/2013 | Mumm et al. | 174/113 R |
| 2003/0086515 | A1 * | 5/2003 | Trans et al. | 375/346 |
| 2004/0120407 | A1 * | 6/2004 | Searles et al. | 375/259 |
| 2005/0015426 | A1 * | 1/2005 | Woodruff et al. | 709/200 |
| 2005/0089126 | A1 | 4/2005 | Zerbe et al. | |
| 2008/0112476 | A1 | 5/2008 | Vong et al. | |
| 2011/0061087 | A1 | 3/2011 | Mank et al. | |

OTHER PUBLICATIONS

Office Action issued for U.S. Appl. No. 13/158,615 dated Sep. 12, 2013.

* cited by examiner

*Primary Examiner* — Chenea Smith
(74) *Attorney, Agent, or Firm* — Pearl Cohen Zedek Latzer Baratz LLP

(57) ABSTRACT

A home multimedia network comprises a plurality of source nodes, wherein each of the source nodes includes an apparatus for concurrently transmitting and receiving high-speed data services; a plurality of sink nodes, wherein each of the sink nodes includes the apparatus for concurrently transmitting and receiving high-speed data services; a switch for connecting a first group of the plurality of source nodes located at one room to one or more sink nodes located at a different room than the first group of source nodes, the first group of source nodes and the one or more sink nodes are connected to the switch through a twisted-pair cable, the high-speed data services are concurrently transported over the twisted-pair cable, wherein the high-speed data services include at least uncompressed multimedia data, Ethernet data, and Universal Serial Bus data.

16 Claims, 4 Drawing Sheets

HOME NETWORK ARCHITECTURE FOR DELIVERING HIGH-SPEED DATA SERVICES

CROSS REFERENCE TO RELATED APPLICATIONS

This application claims the benefit of a U.S. Provisional Application No. 61/297,112 filed on Jan. 21, 2010, which is hereby incorporated by reference for all that it contains.

TECHNICAL FIELD

The invention generally relates to the field of home networking, and more particularly to techniques for delivering uncompressed video on home networks.

BACKGROUND OF THE INVENTION

A typical home network is computer-centered, designed for sharing printers and Internet access within a house. As of today, typical home networks provide limited interest to consumers, who now demand multimedia (audio and video) services to also be provided through home networking. For example, consumers would like to have the ability to watch cable or satellite TV on any TV-set in the home, to watch video downloaded from the Internet on any TV-set, or to listen to music in any part of the house.

With this purpose in mind several home network architectures have been developed. One example for such a home network architecture is based on an internal digital network interconnecting devices in the home. The home network provides connectivity of different types of devices within the home and outside the home. The devices may include analog TV-sets, digital TV-sets, DVRs, VCRs, digital camcorders, personal computers, audio equipment, and so on. The connectivity of the devices is achieved using network interfaces. Multimedia services are introduced into the network through one or more network interface units that are coupled to an external network and to the internal network. An example for such home network architecture may be found in U.S. Pat. No. 6,005,861 to Humpleman.

The drawback of such home networks is that they are not designed to support delivery of high-speed uncompressed video over a link connecting a source device (e.g., a network interface) and a sink device (e.g., a digital TV set). Specifically, existing home network solutions are not designed to support uncompressed video that is compliant, for example, with the high-definition multimedia interface (HDMI) or DisplayPort standards. Furthermore, currently many different services can be provided by home networks. These services include delivery of uncompressed video, Ethernet, universal serial bus (USB) connectivity, and so on. In existing networks, typically there is no capability to concurrently provide two or more of these services over a single link. In order to support concurrent high-speed traffic services a fast switching of data streams of different services is mandatory. This requires a switch connected in the home network to multiplex streams of data from different sources on the same link and then separating the streams to be sent to the different destination(s). Implementing such a switch is almost infeasible. Furthermore, there is no capability to support high-traffic bandwidth of single service (e.g., USB3 traffic) over a single link.

In addition, it is quite often desired by the typical customer to be able to capture the signals from a source device in several destination devices, e.g., being able to connect a VCR to TV-sets in different rooms in the home. It is also desired to be able to place or move these devices anywhere at the home without needing to extend or re-install the connecting cables. A wireless network may achieve these desires. However, these networks are costly and suffer from limited distance between a transmitting device and receiving device. In addition, only point-to-point connections can be achieved.

There is therefore a clear need in the art for a home network architecture that would limit the deficiencies described above.

SUMMARY OF THE INVENTION

Certain embodiments of the invention include a home multimedia network architecture. The home multimedia network includes a plurality of source nodes, wherein each of the source nodes includes an apparatus for concurrently transmitting and receiving high-speed data services; a plurality of sink nodes, wherein each of the sink nodes includes the apparatus for concurrently transmitting and receiving high-speed data services; a switch for connecting a first group of the plurality of source nodes located at one room to one or more sink nodes located at a different room than the first group of source nodes, the first group of source nodes and the one or more sink nodes are connected to the switch through a twisted-pair cable, the high-speed data services are concurrently transported over the twisted-pair cable, wherein the high-speed data services include at least uncompressed multimedia data, Ethernet data, and Universal Serial Bus data.

Certain embodiments of the invention also include an apparatus for concurrently transporting a plurality of high-speed data services between source devices and at least one sink device connected in a home network through a single twisted-pair cable, the apparatus is included in each of the source devices and the sink device. The apparatus comprises an interface for providing a connectivity to the twisted-pair cable; and a plurality of physical layer modules, each physical layer module transports a high-speed data service over a twisted-pair channel and a number of the plurality of twisted-pair channels is the same as a number of twisted-pair channels in the twisted-pair cable; a plurality of a service modules, each service module is capable of processing data of a specific high-speed data service; a link layer module coupled between the physical layer modules and the plurality service of modules and for routing traffic between one of the plurality of physical layer modules and one of the plurality service modules according to a type the high-speed data service.

Certain embodiments of the invention also include a receiver for recovering signals of a high-speed data service transmitted in one twisted-pair channel of a twisted-pair cable. The receiver includes an analog equalizer for initially restoring an input signal by compensating for a frequency dependent attenuation which occurs during transmission of serial data over the twisted-pair cable; a post inter-symbol interference (ISI) predictor for removing ISI components in the equalized input signal generated by the analog equalizer, the post ISI predictor is also adapted to mitigate crosstalk noises from adjacent twisted-pair channels; a first comparator and a second comparator for detecting data bits in the received signal and generating error signals for adjusting coefficients of the post ISI predictor; a third comparator for determining coefficients of the analog equalizer; a clock and digital recovery (CDR) circuit; and a sampling unit for sampling the equalized input signal at a sampling point determined by the CDR circuit, wherein the high-speed data services include any one of a uncompressed multimedia data, an Ethernet data, and a USB data.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
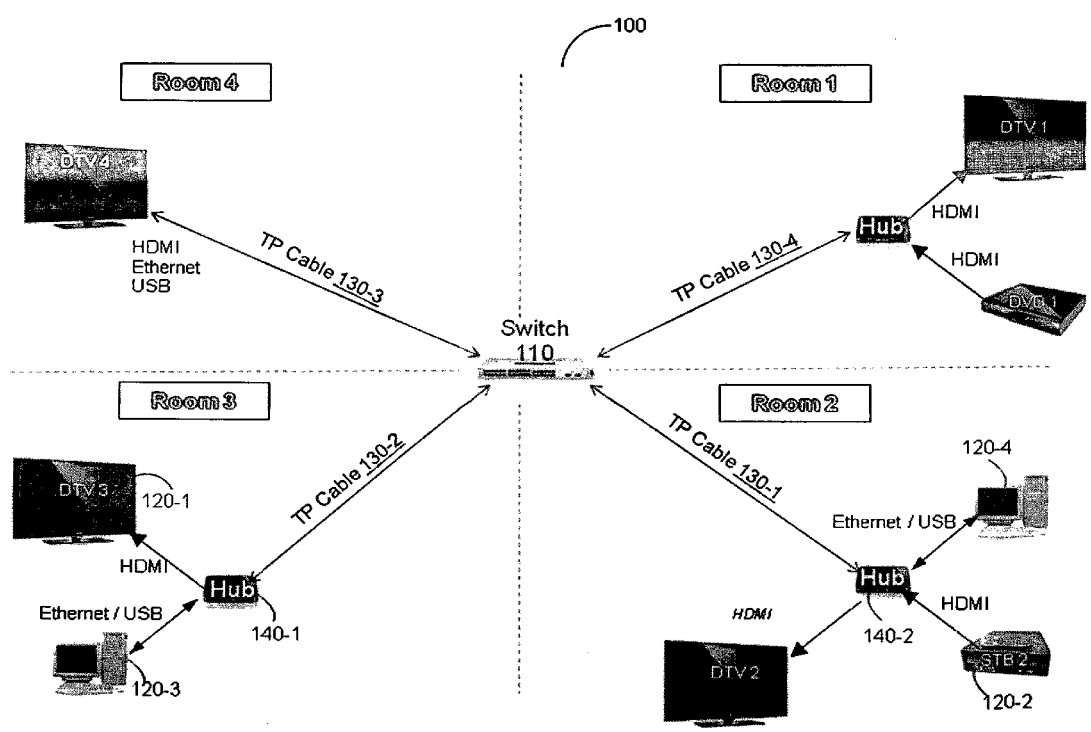
FIG. 1 is a home multimedia network constructed in accordance with the principles of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary diagram of a home multimedia network 100 constructed in accordance with an embodiment of the invention. The network 100 is a star topology network where a switch 110 connects the devices (nodes) 120 located in different rooms of a house. The connection between the switch 110 to a device 120 is through a twisted-pair (TP) cable 130. The TP cable 130 may be, but is not limited to, a cable type of category 5 (CAT-5), CAT-6, CAT-6a, CAT-7, and the like.

A device 120 may be, but is not limited to, a digital TV-set, a computer, a high-definition set-top box, a digital video recorder (DVR) player, a Blue-ray player, a game console, a camcorder, and the like. The home network 100 may also include one or more aggregators 140 connecting a plurality of different types of devices 120 to the switch 110.

The devices 120 support high-speed data services delivered over the TP cables 130. These high-speed data services include delivery of at least uncompressed multimedia (video/audio) content, Ethernet data, and high speed serial bus data (e.g., USB2 or USB3). In an embodiment of the invention, the uncompressed multimedia data is compliant with at least one of the HDMI, DisplayPort, DiiVA, and other standards for transmitting of uncompressed high definition multimedia data.

In accordance with the principles of the invention, one or more of the high-speed data services can be delivered concurrently over a single TP cable 130. Specifically, a TP cable includes a plurality of twisted-pair wires, each of which is referred to hereinafter as a TP channel. Each TP channel can independently carry data belonging to a different high-speed data service.

In an exemplary embodiment of the invention, a TP cable 130 is any of a Category 5, Category 5e, Category 6, and Category 6a, and Category 7 cable. Such a cable type includes four twisted pairs (channels) in a single cable jacket. The advantages of using such cables are their cost (typically a fraction of a HDMI cable) and the fact that many houses are already wired using, for example, Category-5 or Category-6 cables.

The high-speed data services can be modulated over the same TP cable 130, where a service may be carried on one or more channels of the TP cable 130. As will be described above various techniques can be used to modulate signals of different services over a TP cable 130.

Furthermore, each TP cable 130 can transport data in two different directions (bi-directional) simultaneously. With this aim, each channel in the TP cable 130 may be dynamically configured as either a receiver or transmitter. This feature is required as the location of source devices (e.g., set-top boxes) and sink devices (e.g., TV-sets) may be changed.

Following is a non-limiting example describing the capabilities of the home network 100. A TV-set 120-1 connected in room 3 received uncompressed video from a set-top box (STB) 120-2 connected in room 2. The uncompressed video (e.g., HDMI video) is transported from the STB 120-2 over the TP cable 130-1 to the switch 110 which routes the video to the aggregator 140-1. At the same time, a user of a computer 120-3 saves data files to a computer 120-4 located in room 4. With this aim, the computer 120-3 is connected to the aggregator 140-1 through a USB cable and data files are sent from the aggregator 140-1 over the TP cable 130-2 to the switch 110, which routes the data to the aggregator 140-2 (in room 2) over the TP cable 130-1. The aggregator 140-2 is coupled to the computer 120-4. It should be apparent from this example that the uncompressed video and USB data are concurrently transmitted over the TP cables 130-1 and 130-2 in different directions. If, for example, the TP cables 130 are CAT-5 or CAT-6 cables, then two (2) channels may be utilized to carry the uncompressed video and two (2) channels are reserved for the USB data. It should be noted that the channels carrying the USB data can carry Ethernet data concurrently.

In accordance with an embodiment of the invention over the home network 100, Ethernet data with high-speed data at a rate of 1 Gbps and above, USB data at a rate of 480 Mbps or 5 Gbps, and HDMI data of 5 Gbps and above can be transported. Generally, the HDMI specification requires about 4.8 Gbps for standard 1080P/60 Hz/8 bits channel and about 9 Gbps for higher color depth or higher resolutions (like 3D video, or 4K×2K, which are new resolutions). In accordance with an embodiment of the invention, a single TP channel can be used for 1080P/60 Hz/8 bits streams and two TP channels are utilized for the 9 Gbps streams. Therefore, in accordance with certain embodiments of the invention each TP channel in a TP cable is able to support data rates of at least 5 Gbps.

In an embodiment of the invention, the switch 100 may be implemented as a simple switch (e.g., switch 100) which does not implement sophisticated multiplexing techniques. This is enabled in the proposed architecture, as different streams are usually transported on separate TP channels of the cable. Thus, the implementation of the switch 100 is much simpler and cost effective.

In another embodiment of the invention, the switch 100 may be integrated in the TV set, thereby enabling direct connection between different devices. In another embodiment of the invention, the aggregator 140 may be integrated in the TV set (e.g., as shown in TV 120-2) allowing the TV set to aggregate HDMI, Ethernet and USB connections, to be used internally in the TV or from other sources that are connected directly to the TV using proprietary cables (e.g., USB and HDMI) and/or TP cables.

To enable the nodes in the home network 100 to share different high-different speed services over a TP cable, an apparatus is installed in each of the nodes (e.g., a TV-set, a STB, a computer, a switch, and an aggregator). Specifically, the apparatus should enable a reliable bi-directional transport of different types of high-speed signals, e.g., signals at date rate of at least 5 Gbps. The transport of such signals induces noises, hence high-speed data services should be done in a way that a transmitted signal can be reliably received and decoded by a receiving node. However, the TP cables running between rooms are significantly longer than, for example, an HDMI cable that connects a TV-set directly to a set-up box. One of ordinary skill will recognize that longer cables transporting high-speed signals induce noise signals (e.g., crosstalk signals), that in most cases, eliminate the ability to recover the signals.

Figure 2:
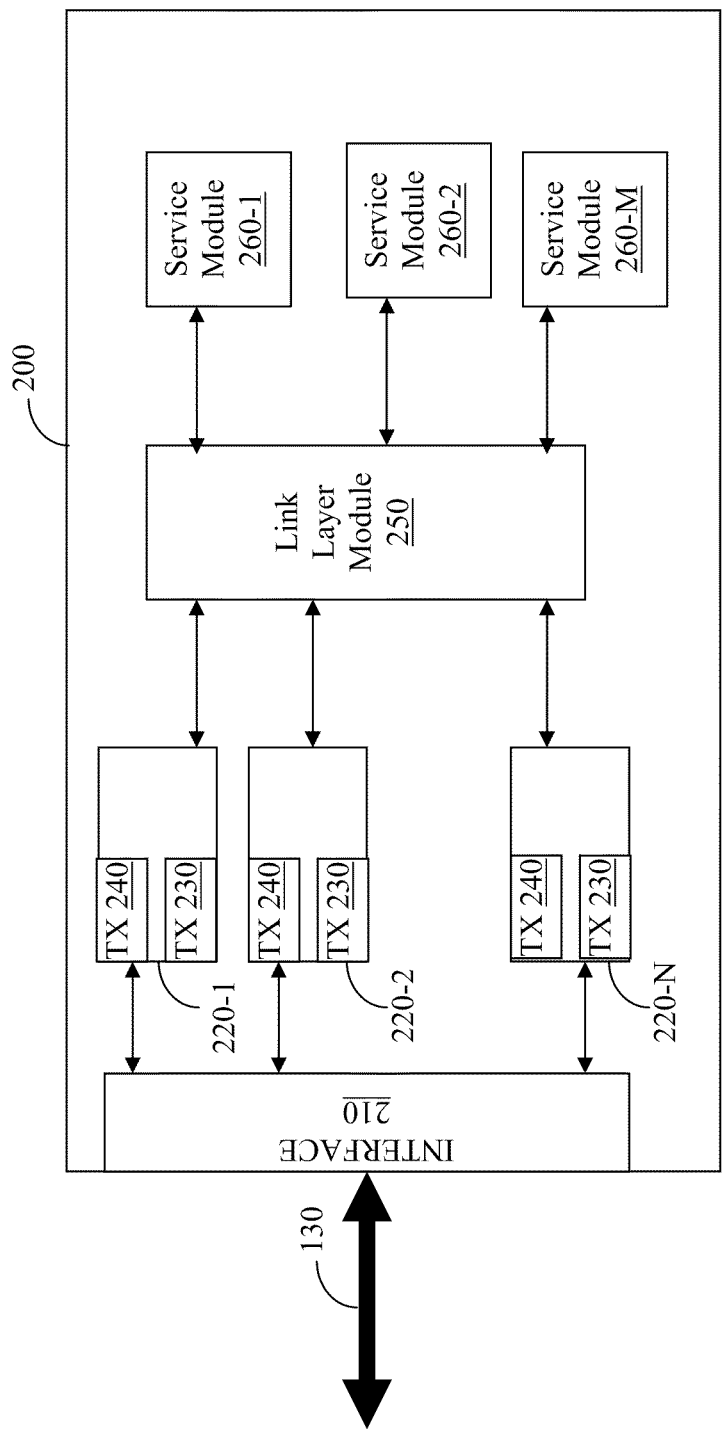
FIG. 2 is a diagram of a PHY module implemented in accordance with an embodiment of the invention.

FIG. 2 shows a non-limiting and exemplary block diagram of an apparatus 200 for transporting high-speed data services in a home network constructed in accordance with an embodiment of the invention. The apparatus 200 includes an interface 210 and a number of N physical (PHY) layer modules 220-1 through 220-N. Each of the PHY layer modules 220-1 through 220-N includes a receiver 230 for recovering signals of a high-speed data service and a transmitter 240 for transmitting signals according to the modulation techniques implemented by the PHY layer module. Each of the PHY layer modules 210-1 through 210-$n$ can recover and transmit signals of any of the high-speed data services. For example, any PHY layer modules 210 can handle uncompressed multimedia data, Ethernet data, and USB data.

The PHY layer modules 220-1 through 220-N are also connected to a link layer module 250 which is further coupled to a plurality service modules 260. Each of the service modules 260 processes data respective of a specific high-speed data service. The service modules 260 may be, for example, an Ethernet MAC module, a USB controller, and video processor for processing of the uncompressed multimedia data. The link layer module 250 forwards signals received through a PHY layer module 210 to one the service modules 260 that handle the service of the received signals. In addition, signals from a service module are routed, by the link layer module 250, to the respective PHY layer module. For example, if the PHY layer module 220-1 processes the uncompressed multimedia data, signals received through the module 220-1 are directed to a video processor (one of the service modules 260) and uncompressed multimedia data that should be transmitted is routed to the PHY layer module 220-1. The routing between a PHY layer module 220 and to a service module 260 is according to, for example, a tag name, a MAC address, and so on.

The interface 210 provides connectivity to the TP cable 130. The number of PHY layer modules 220-1 through 220-N is the same as the number of TP channels in the TP cable 130. Hence, each PHY layer modules 220-$i$ serves as a single TP channel. In one embodiment of the invention, the apparatus 200, by means of the PHY layer modules 220-1 through 220-N, modulates the different high-speed data services over the TP cable 130 using a non-return-to-zero (NRZ) modulation technique. When performing the NRZ modulation, certain channels in the TP cable can be used for upstream traffic and, at the same time, other channels for downstream traffic. Transporting different high-speed signals on different channels encapsulated in a single cable, require cancellation of crosstalk noise signals, near end crosstalk (NEXT) and far end crosstalk (FEXT), by each of the PHY layer module 210-1 through 210-N. Further, when NRZ modulation is implemented, signals are transmitted, by a transmitter 220, at NRZ levels, i.e., positive voltage and negative voltage signals.

Figure 3:
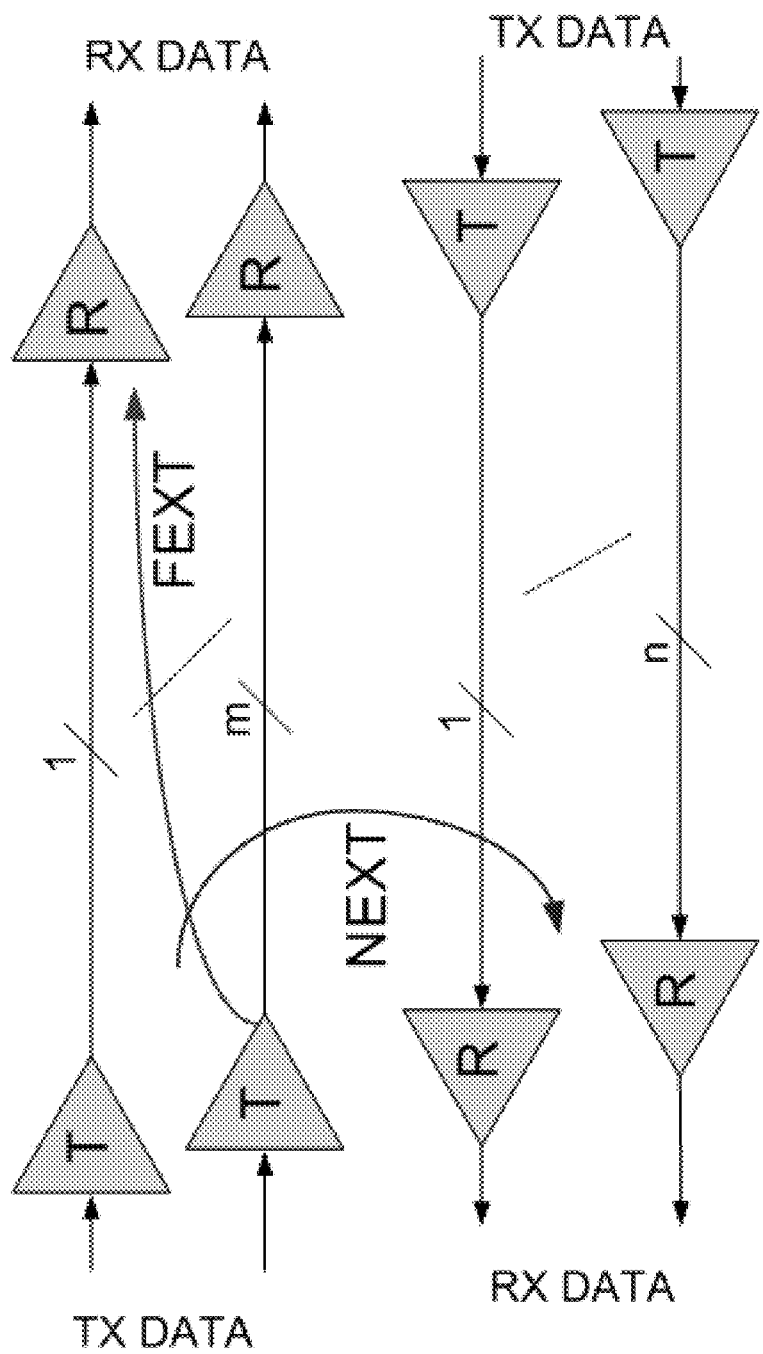
FIG. 3 is a diagram illustrating the measurement of NEXT and FEXT.

As shown in FIG. 3, the NEXT is the interference between two twisted pairs of a cable (i.e., a TP channel) measured at the same end of the cable as the transmitter. The FEXT is the interference between two pairs of the cable measured at the other end of the cable from the transmitter.

In another embodiment, a NRZ modulation based on a shielded channel where the TP cable and its connecters are designed to minimize the crosstalk noise signals is provided. According to other embodiments of the invention, modulation of different high-speed data services over the TP cable 130 can be achieved using a pulse-amplitude modulation (PAM) modulation or an orthogonal frequency-division multiplexing (OFDM) modulation.

Figure 4:
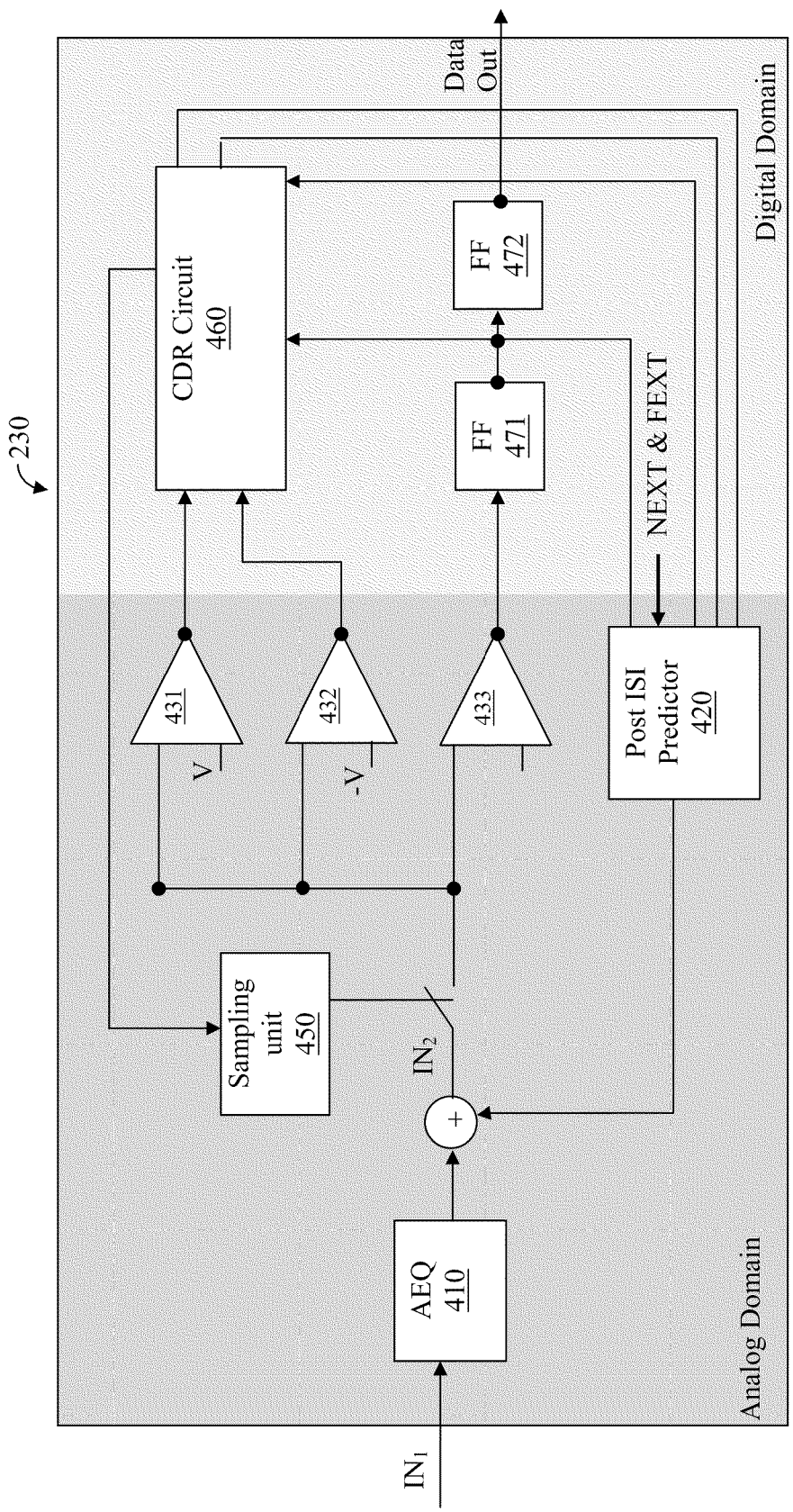
FIG. 4 is a block diagram of a physical layer receiver implemented in accordance with an embodiment of the invention

FIG. 4 shows an exemplary and non-limiting block diagram of a receiver 230 in a PHY layer module 210 implemented in accordance with an embodiment of the invention. The receiver 230 is designed to cancel crosstalk noise signals and provide signal equalization at the analog domain (processing of analog signals).

The receiver 230 includes, in the analog domain, an analog equalizer (AEQ) 410, a post inter-symbol interference (ISI) predicator 420, and comparators 431, 432, and 433. Further included in the analog domain are a phase-locked loop (PLL), phase interpolator (PI) and switch which are part of a sampling unit 450 which samples the input signal at sampling point determined by the digital clock and digital recovery (CDR) circuit 460. The CDR circuit 460 and flip-flops 471 and 472 are in the digital domain (processing of digital signals).

The analog equalizer (AEQ) 410 and post ISI predicator 420 implement a decision feedback equalizer (DFE). The analog equalizer 410 initially restores an input signal $IN_1$ by compensating for the frequency dependent attenuation that occurs during transmission of serial data over the physical TP cable 130. The analog equalizer 410 does not generate an equalized signal, but rather a signal that includes ISI components, which are later removed by the post ISI predictor 420. To facilitate the DEF, the equalization coefficients of the post ISI predictor 420 are set based, in part, on error signals generated by the comparators 431 and 432. Specifically, the comparators 431 and 432 output a high logic value and a low logic value respectively by comparing the signal $IN_2$ to a high voltage level (V) and a low voltage level (−V). The comparators 431 and 432 further generate error signals based on the differences between the voltage levels (V, −V) and the input signal $IN_2$. For example, if the input signal $IN_2$ is +1.4v and the V is set to +1v, then the error of the received signal is +0.4v, thus a high logic value is output. The CDR circuit 450 adjusts the coefficient of the post ISI predictor 420 based on the logic values generated by the comparators 431 and 432. For example, a high logic value may cause to increase the post ISI predictor's 420 coefficients. For example, when a NRZ modulation is implemented, signals are transmitted at voltage levels of −1v and +1v, thus the comparators' 431 and 432 voltage levels are set to +1v and −1v, respectively.

The output of the comparator 433 is used to determine the coefficients of the analog equalizer 410 by the CDR circuit 450. This function is performed by a least mean squares (LMS) unit (not shown) in the CDR circuit 450. The equalizer's coefficients are determined relatively to previous decisions (cycles), as the output of the comparator 433 is delayed by means of flip-flops 461 and 462.

The post ISI predictor 420 also receives FEXT and NEXT indications from adjacent TP channels to mitigate the crosstalk noises. Thus, the output of the ISI predictor 420 is a signal free of noises that can be properly recovered by the CDR 450. One of ordinary skill will recognize that cancellation of crosstalk noises in the analog domain allows efficiently recovery of high-speed signals while reducing the power consumption of the PHY layer module 210.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A home multimedia network, comprising:
    a plurality of source nodes, wherein each of the source nodes includes an apparatus for concurrently transmitting and receiving high-speed data services;
    a plurality of sink nodes, wherein each of the sink nodes includes the apparatus for concurrently transmitting and receiving high-speed data services;
    a switch for connecting a first group of the plurality of source nodes located at one room to one or more sink nodes located at a different room than the first group of source nodes, the first group of source nodes and the one or more sink nodes being connected to the switch through a twisted-pair cable, wherein the twisted-pair cable includes a plurality of channels, each channel independently and concurrently carrying data belonging to a different high-speed data service, and each channel dynamically configured as either a receiver or a transmitter, the high-speed data services being concurrently transported over the twisted-pair cable, wherein two of the channels carry uncompressed multimedia data and two of the channels carry USB data and Ethernet data concurrently.

2. The home multimedia network of claim 1, further comprises: an aggregator for connecting the first group of the plurality of source nodes to the switch, wherein the connection between each of the source nodes in the first group of source nodes is achieved using a proprietary cable and the connection between the aggregator and the switch is through the twisted-pair cable.

3. The home multimedia network of claim 2, wherein each of the aggregator and switch includes the apparatus for concurrently transporting high-speed data services over the twisted-pair cable.

4. The home multimedia network of claim 2, wherein the proprietary cable is at least one of: a high definition multimedia interface cable, a Display Port cable, and a USB cable.

5. The home multimedia network of claim 1, wherein a sink node is at least a high definition digital TV set.

6. The home multimedia network of claim 1, wherein a source node is any one of: a high definition set-top box, a Digital Video Disc (DVD) player, a Blue-ray player, a game console, a camcorder, and a computer.

7. The home multimedia network of claim 1, wherein the apparatus comprises:
    an interface for providing a connectivity to the twisted-pair cable; and
    a plurality of physical layer modules, each physical layer module transports a high-speed data service over a twisted-pair channel and a number of the plurality of physical layer modules is the same as a number of the twisted-pair channels; and
    a plurality of a service modules, each service module is capable of processing data of a specific high-speed data service received through and routed to a respective one of the plurality of physical layer modules.

8. The home multimedia network of claim 7, wherein a physical layer modules comprises:
    a transmitter for transmitting signals of the high-speed data service as non-return-to-zero (NRZ) codes; and
    a receiver for recovering signals of the high-speed data service received on the twisted-pair channel.

9. The home multimedia network of claim 1, wherein the signals of the high-speed data services are transported at a date rate of at least 5 Gbps.

10. The home multimedia network of claim 8, wherein the receiver further comprises:
    an analog equalizer for initially restoring an input signal by compensating for a frequency dependent attenuation which occurs during transmission of serial data over the twisted-pair cable;
    a post inter-symbol interference (ISI) predictor for removing ISI components in the equalized input signal generated by the analog equalizer, the post ISI predictor is also adapted to mitigate crosstalk noises from adjacent twisted-pair channels;
    a first comparator and a second comparator for detecting data bits in the received signal and generating error signals for adjusting coefficients of the post ISI predictor;
    a third comparator for determining coefficients of the analog equalizer;
    a clock and digital recovery (CDR) circuit; and
    a sampling unit for sampling the equalized input signal at a sampling point determined by the CDR circuit, wherein the analog equalizer, the post ISI predictor, the first, second, and third comparators, and the sampling unit are operable in an analog domain of the receiver and the CDR circuit is operable in a digital domain of the receiver.

11. The home multimedia network of claim 1, wherein the plurality of service modules include at least an Ethernet MAC module, a USB controller, and a video processor.

12. The home multimedia network of claim 1, wherein the twisted-pair cable is at least one of: Category 5, Category 5e, Category 6, and Category 6a, and Category 7.

13. An apparatus for concurrently transporting a plurality of high-speed data services between source devices and at least one sink device connected in a home network through a single twisted-pair cable, the apparatus is included in each of the source devices and the sink device, comprising:
    an interface for providing a connectivity to the twisted-pair cable; and
    a plurality of physical layer modules, wherein each physical layer module transports a high-speed data service over a twisted-pair channel and a number of the plurality of physical layer modules is the same as a number of twisted-pair channels in the twisted-pair cable;
    a plurality of service modules, each service module is capable of processing data of a specific high-speed data service received through and routed to a respective one of the plurality of physical layer modules,
    wherein the twisted-pair cable includes a plurality of channels, each channel independently and concurrently carrying data belonging to a different high-speed data service, and each channel dynamically configured as either a receiver or a transmitter and wherein two of the channels carry uncompressed multimedia data and two of the channels carry USB data and Ethernet data concurrently.

14. The apparatus of claim 13, wherein each of the physical layer modules comprises: a transmitter for transmitting signals of the high-speed data service as non-return-to-zero (NRZ) codes; and a receiver for recovering signals of the high-speed data service received on the twisted-pair channel.

15. The apparatus of claim 14, wherein the signals of the high-speed data services are transported at a date rate of at least 5 Gbps.

16. The apparatus of claim 15, wherein the receiver further comprises:
an analog equalizer for initially restoring an input signal by compensating for a frequency dependent attenuation which occurs during transmission of serial data over the twisted-pair cable;
a post inter-symbol interference (ISI) predictor for removing ISI components in the equalized input signal generated by the analog equalizer, the post ISI predictor is also adapted to mitigate crosstalk noises from adjacent twisted-pair channels;
a decision feedback equalizer (DFE) for adjusting coefficients of the post inter-symbol interface (ISI) predictor based in part on error signals generated by a first comparator and a second comparator;
the first comparator and the second comparator for detecting data bits in the received signal and generating error signals for adjusting coefficients of the post ISI predictor;
a third comparator for determining coefficients of the analog equalizer;
a clock and digital recovery (CDR) circuit; and
a sampling unit for sampling the equalized input signal at a sampling point determined by the CDR circuit, wherein the analog equalizer, the post ISI predictor, the first, second, and third comparators, and the sampling unit are operable in an analog domain of the receiver and the CDR circuit is operable in a digital domain of the receiver.

* * * * *